March 17, 1953 E. A. BURROWS 2,631,381
APPARATUS FOR MAKING WALLBOARD
Filed July 10, 1947 5 Sheets-Sheet 1

INVENTOR.
EASTMAN A. BURROWS
BY
*Munn, Liddy, Glascum & Rich*
Attys.

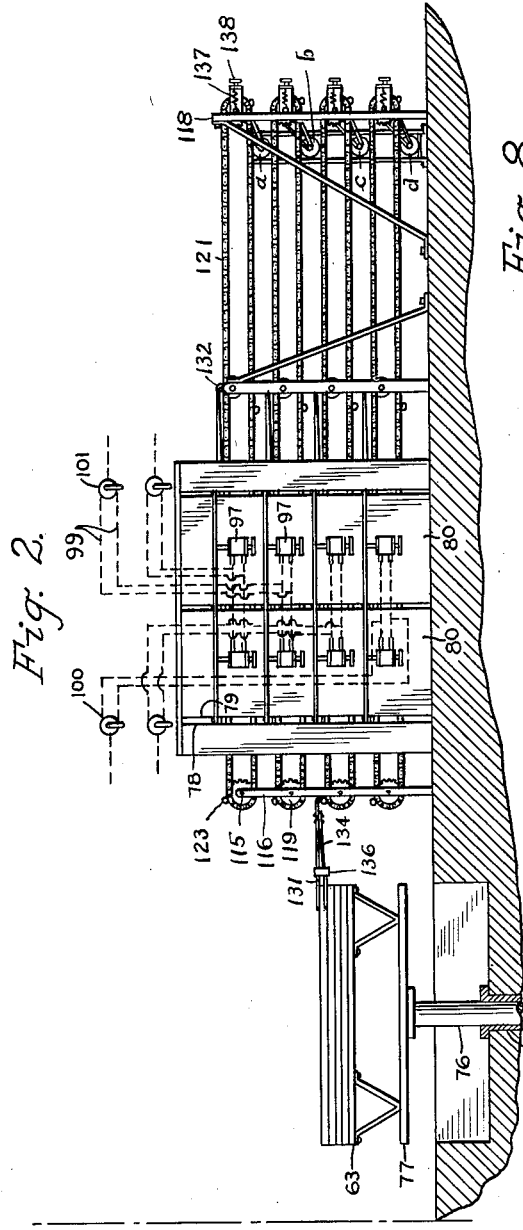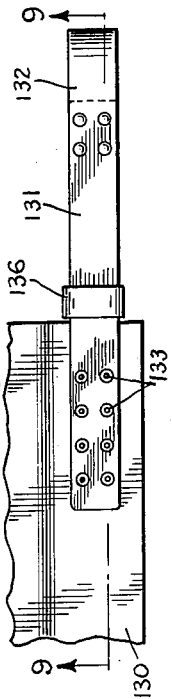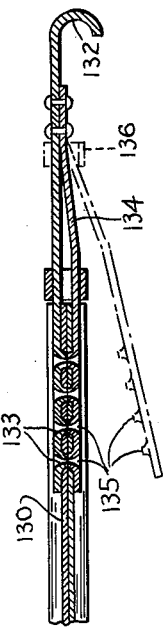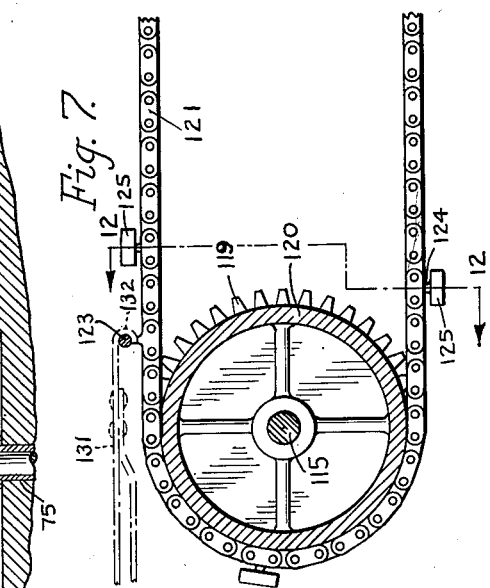
INVENTOR.
EASTMAN A. BURROWS

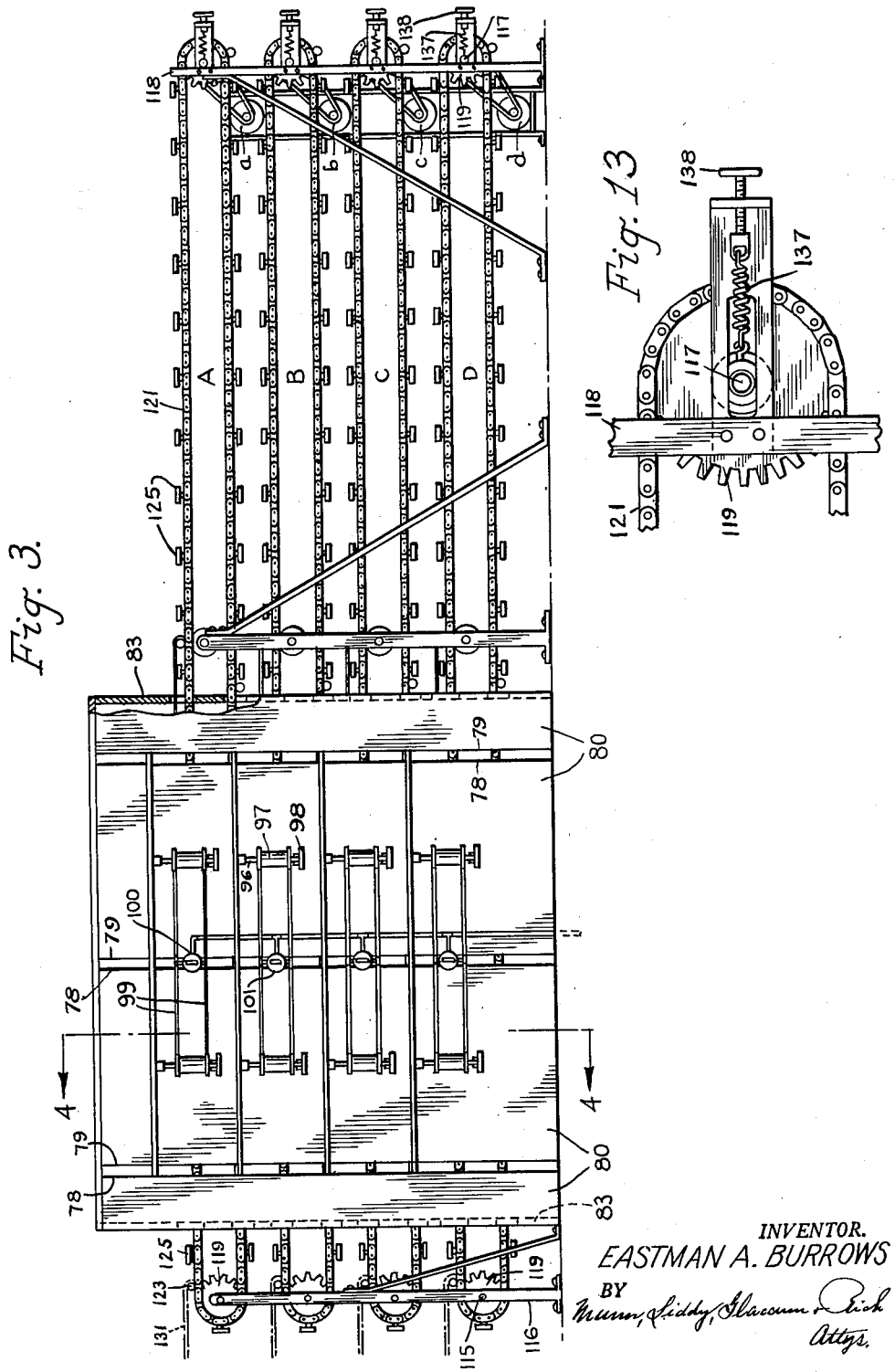

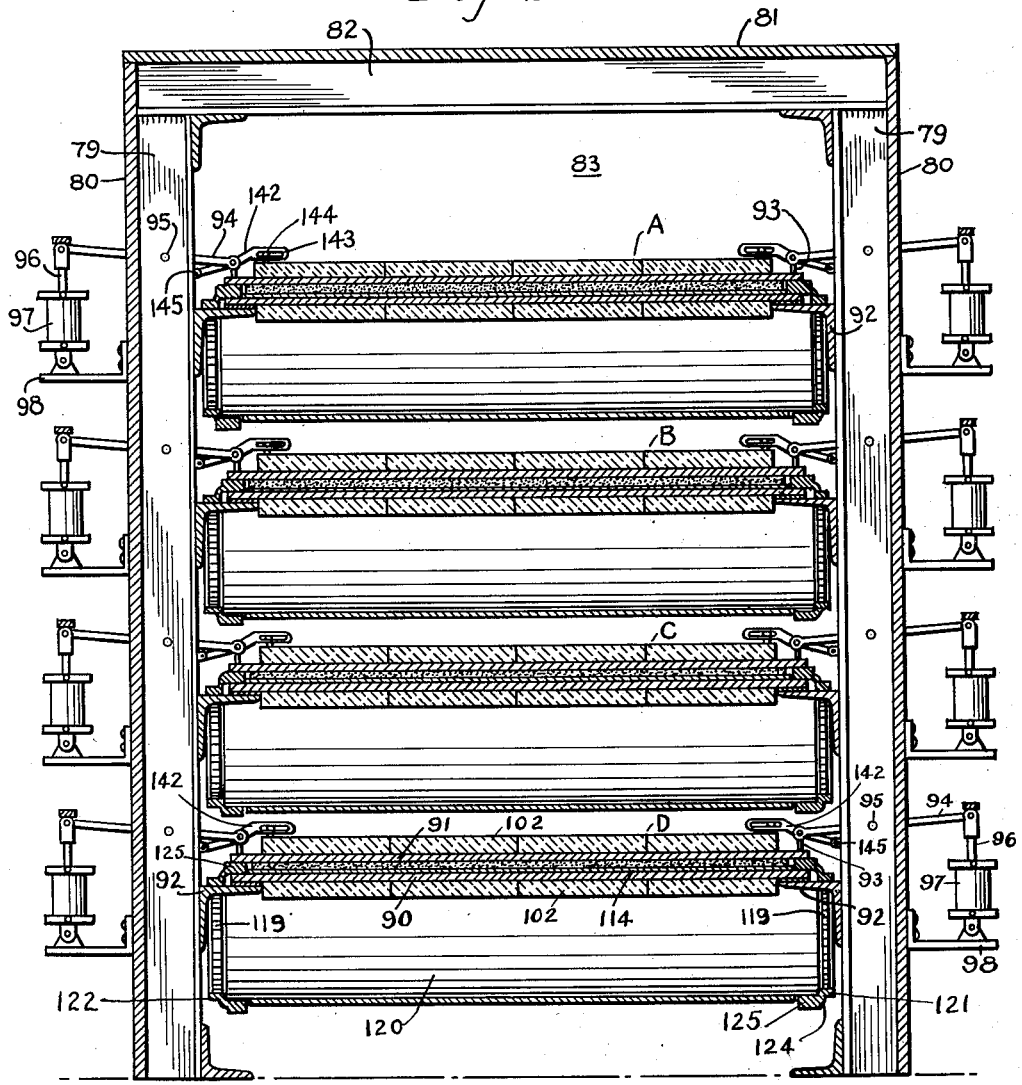

March 17, 1953      E. A. BURROWS      2,631,381
APPARATUS FOR MAKING WALLBOARD
Filed July 10, 1947      5 Sheets-Sheet 5
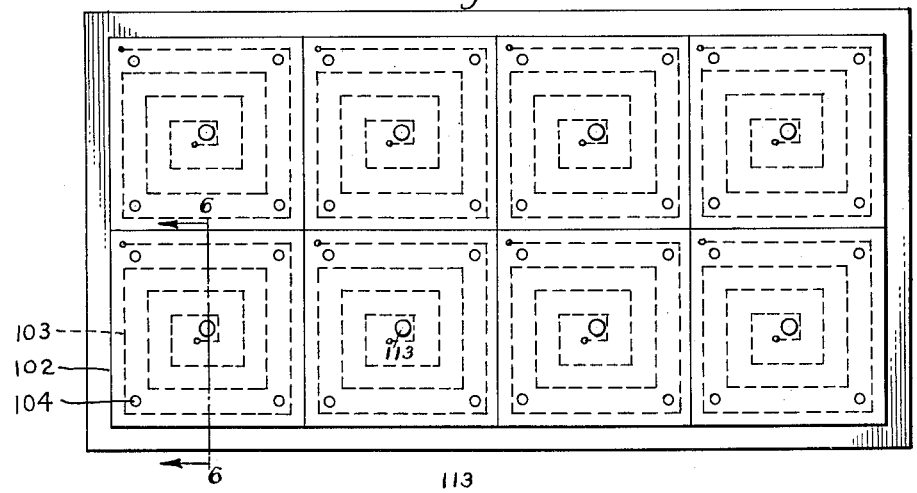
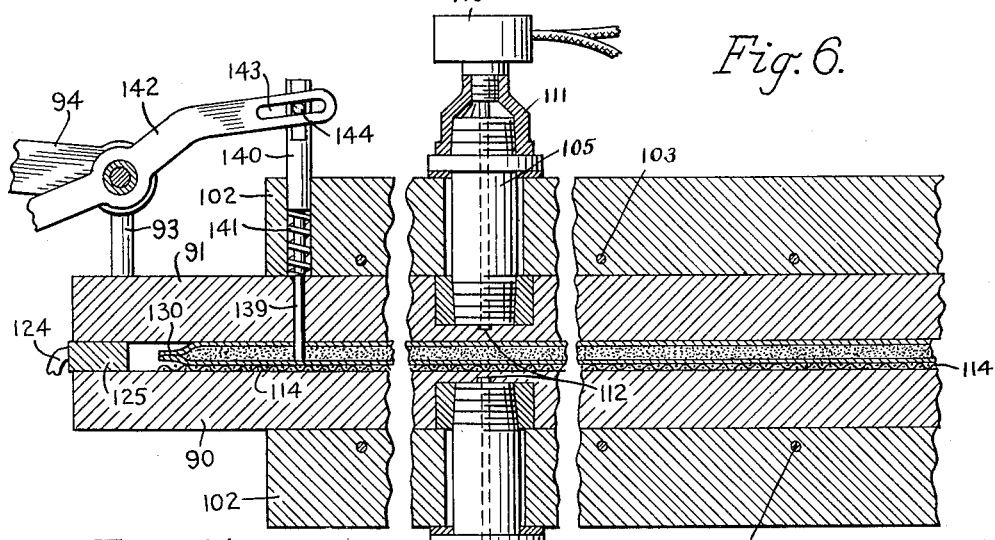
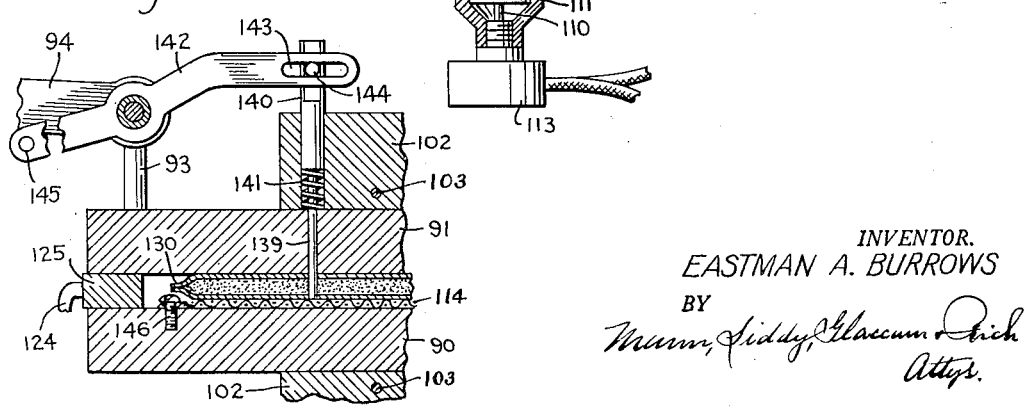
INVENTOR.
EASTMAN A. BURROWS Patented Mar. 17, 1953

2,631,381

UNITED STATES PATENT OFFICE 2,631,381

APPARATUS FOR MAKING WALLBOARD

Eastman A. Burrows, Washington, D. C., assignor to Stanley D. Libbey, Washington, D. C.

Application July 10, 1947, Serial No. 760,161

3 Claims. (Cl. 34—144)

My present invention has for its object to provide certain improvements in the methods of and apparatus for producing wall board of uniform thickness which may be produced in desired widths either continuously and severed into sheets of standard lengths after curing, or may be cut into sheets of the desired length and subsequently heat-treated to produce the finished product.

Another object of my invention is the provision of apparatus adapted for continuous operation whereby the green wall board is formed by the introduction of the materials which are to be intumesced between paper liners, cut into sheets of given length and delivered singly between sets of heated platens, a plurality of said sets being disposed one above the other, means being provided for automatically operating each of said sets independently and successively.

My invention has a further object to provide a novel construction for the platens used in the manufacture of wall board whereby their temperature may be automatically controlled throughout their entire area.

A still further object of my invention is the provision of means for automatically introducing the green or uncured sheets between the platens, releasing the latter upon the termination of the curing operation and conveying the intumesced sheets to a delivery point simultaneously with the placement of a fresh sheet between the platens.

Another object of my invention is to incorporate a foraminous bed underlying the green sheets as part of the sheet heating mechanism which not only enables them to be moved longitudinally and eliminates the possibility of severing or breakage while in the moist state but also provides for the escape of gases or steam from all points of the sheet during the intumescing operation.

Furthermore, my invention provides a novel means for perforating the edges of wall boards during the curing operation, whereby spaced openings are provided to receive the nails or other securing devices by which said sheets can be subsequently fastened to studding in building structures, thus eliminating the possibility of breaking the edges of wall boards when they are fixed in place.

To these and other ends, my invention comprises further improvements and arrangements of parts, all as will be more fully described in the following specification, the novel features thereof being set forth in the appended claims.

In the drawings:

Figure 2 is a continuation of Fig. 1 illustrating the delivery of successive sheets to the oven containing a tier of sets of platens and the sheet conveyors operating in conjunction with each of said sets.

Figure 3 is an enlarged view of the oven and the sheet conveyors passing therethrough.

Figure 4 is a vertical sectional view of the oven taken on the line 4—4 of Fig. 3.

Figure 5 is a plan view of a heating platen.

Figure 6 is an enlarged sectional view of a portion of a platen taken on the line 6—6 of Fig. 5 showing the thermal control devices and the elements employed in perforating the edges of the sheets.

Figure 7 is a detail view of one end of a sheet conveyor.

Figure 8 is a top plan view showing the form of gripper employed as a connecting element between the conveyor and the forward lateral edges of a sheet for pulling it into place between a set of platens.

Figure 9 is a vertical sectional view of a gripper taken on the line 9—9 of Fig. 8.

Figure 11 is a detail vertical sectional view of a modification taken at the platen edges showing one of the perforators operating in conjunction with a wall board sheet carried on the mat surface of Fig. 10.

Fig. 13 is a detail showing a chain tensioning detail.

Similar reference characters in the several figures indicate similar parts.

My invention is employed particularly in the commercial production of wall board which is first produced as a green or uncured sheet formed by a plastic mixture characterized by the fact that the moisture contained in its ingredients is expelled by the application of heat. An example of such board is one comprising a filler such as powdered lime stone, with or without other ingredients, mixed with sodium silicate, the composition being such that it puffs or intumesces when subjected to heat at a temperature sufficient to drive off the excess moisture. The steam thus created forms a porous body and causes the mixture to harden, becoming water repellent and capable of being readily handled in sheets of commercial sizes.

Figure 1:
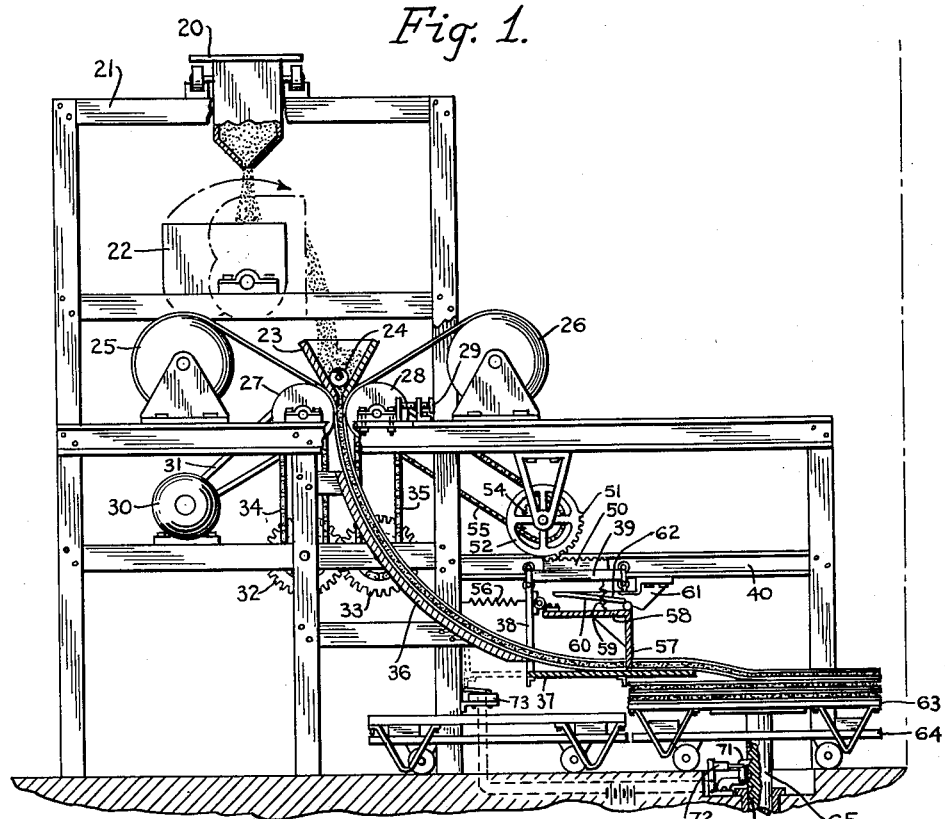
Figure 1 is a side elevation of one end of a wall board machine embodying my invention showing the apparatus for forming the green board.
Figure 10:
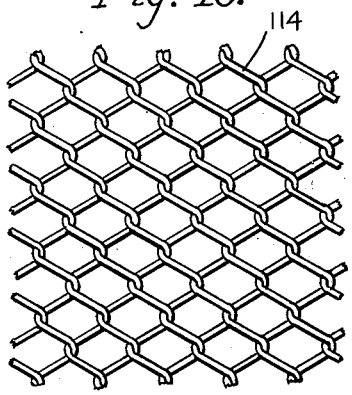
Figure 10 is a plan view of a portion of a mat surface on which the green board sheet rests during the curing period which may be either attached to a lower platen, or comprise an endless conveyor movable across the face of such platen.
Figure 12:
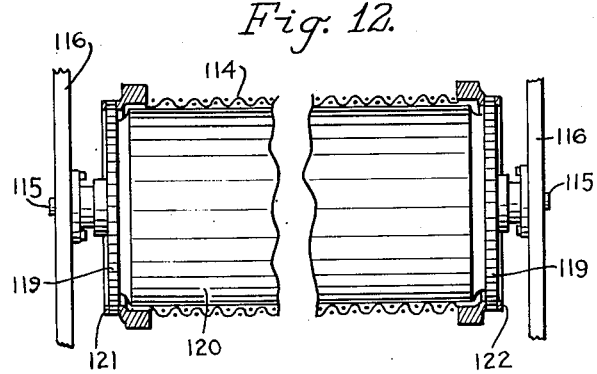
Figure 12 is an elevational end view of one of the conveyors, as seen when looking in the direction of the arrow on section line 12—12 of Fig. 7 showing the conveyor chain sprockets and the drum supporting the forward end of the foraminous belt.

In Fig. 1 I have shown somewhat diagrammatically the essential features of the apparatus for preparing the green sheet. The plastic mix ingredients are fed from an elevated traveling hopper 20, supported on the framework 21, into a mixer 22 from which it is discharged into a V-shaped trough 23 having a restricted bottom opening or slot equal to the width of the sheet to be formed. Above the slot in the trough is a distributor 24 which assures an even discharge of material.

It is customary to run the dough-like or plastic mass between facings of a suitable grade of paper, such as chip board, and to this end two rolls of paper 25, 26 are shown, the paper being led therefrom over forming rolls 27, 28. The latter are spaced apart at opposite sides of the trough opening to form the green sheet passing between them. In order that the thickness of the green sheet may be controlled and adjusted as desired, the journal boxes of one of the rolls, such as 28, is mounted for adjustment by means of regulating screws 29.

Power for driving the rolls 27 and 28 is furnished by a motor 30 connected to one of them by a belt 31. Synchronized rotation of the rolls in opposite directions and the above mentioned adjustment is provided by a pair of intermeshing gear wheels 32, 33 located below one end of the rolls and carrying sprocket wheels driven by chains 34, 35 trained over sprockets on the corresponding rolls 27, 28.

The sheet as it is discharged from the rolls 27, 28 is received on a curved guide 36 along which it passes by gravity, so that its lower end passes into a horizontal position for severance into sheets of standard sizes and delivery onto a pallet for transfer to a curing oven.

As the forward end of the sheet leaves the end of runway 36 it passes through a cutting mechanism comprising a vertically reciprocating knife and an underlying cutting plate which move forwardly with the sheet during the descent of the knife and are retracted to their original position for a reoccurrence of the cycle of operation. The cutting mechanism, as shown in Fig. 1, is a horizontal plate 37 suspended at its ends on hangers 38 carried on cars 39 guided on horizontal rail portions 40 of the machine framework. Intermittent outward movement of the plate 37 in accordance with the speed of movement of the wall board sheet is accomplished through a gear rack 50, on car 39, with which there engages periodically the teeth 51 of a mutilated gear wheel 52, journaled on bracket 53 and provided with a sprocket 54 driven by a chain belt 55 driven from a sprocket on one end of the presser roll 28. The return movement of car 39 and plate 37 is accomplished by a spring 56. The knife or guillotine 57 is carried on a pivoted arm 58 the free end of which is yieldingly held by a spring 59 in engagement with a cam surface 60 on an arm 61 rigidly supported on the frame rail 40. Cam surface 60 is so positioned that as the knife moves outwardly with a sheet it will be forced downwardly and when it reaches the end of its travel it will be lifted by spring 59 to clear the sheet and permit its return by spring 56 for the next cutting operation. On the retraction of the knife the stud on the end of arm 58 when passing off the end of cam 60 and lifted by spring 59 enters a slot 62 the rear end of which is inclined downwardly to direct the stud in alinement with the cam face 60 at the instant gear teeth 51 engage the rack 50 on carriage 39.

As the green wall board sheet advances under the knife 57 its free end passes onto a pallet 63 mounted for convenient transportation purposes on a car 64. In order that each pallet may carry a number of cut sheets and the latter delivered thereto without damage, or unnecessary handling, I provide at the loading point a vertically adjustable pillar 65 which is initially positioned to support a pallet in an elevated position with the upper surface in sheet receiving position and is capable of being stepped down as successive sheets are superimposed. This I accomplish by providing the pillar with teeth or recesses 70 in which engages a pawl 71 retracted by a magnet in the form of a solenoid 72. The latter is in circuit with a switch 73 which is tripped upon each return movement of the cutting mechanism thus dropping the previously severed sheet below the advancing forward edge of the succeeding sheet.

At a suitable distance in front of the structure shown in Fig. 1 I arrange one of more sheet curing ovens, one of which is shown in Fig. 2. When two or more of these are employed they are arranged parallel to each other and suitable trackage extends in front of the ovens for the lateral movement of the loaded pallets and their positioning in alinement with the oven. In front of the oven I provide a hydraulic lift or elevator for the pallets 63 comprising the cylinder 75 and the piston 76 carrying the platform 77 on which the loaded pallets are placed and by means of which they may be adjusted step by step to position the uppermost green board sheet in alinement with the respective sets of heat treating elements in the oven, or ovens, in readiness to be transferred thereto.

The aforementioned oven is a rectangular housing. Its sides are constructed of three or more vertically extending pairs of channel or angle irons 78, 79, spaced apart to form narrow openings provided for a purpose to be presently described, said pairs being also spaced relatively, the intervening spaces being closed by panels 80. The top of the oven is closed by a roof 81 supported on the beams 82 carried by the upper ends of the channels. The ends of the oven are closed by sectional panels 83 formed with openings of minimum size adapted for the convenient passage of the conveyors.

The curing of the green sheets is accomplished by placing them between sets of heated platens located in the oven and one of the important features of my invention resides in the construction of the platens per se whereby an accurately controlled temperature may be automatically maintained. Each set of platens comprises a lower element in the form of a plate 90 and a similar upper element or plate 91, the two elements being spaced apart a fixed distance according to the final thickness intended for the puffed or finished sheet of wall board. The lower plates 90 are supported horizontally in the oven on brackets 92 extending inwardly from the several channel irons 78, 79. The upper plate 91 is suspended parallel to the lower plate by elevating mechanism attached to its edges which is arranged to lift it bodily upon completion of the curing operation. To this end the plate 91 is provided on its upper side adjacent its lateral edges with fixed eye bolts 93 to which are attached the inner ends of lever arms 94. The latter project through the spaces between the several channel irons 78, 79 on which they are pivoted as indicated at 95. The outer ends of the lever arms 94 are connected to piston rods 96 of pistons operating in cylinders 97 supported on brackets 98 on the exterior of the oven. It will be seen from Figs. 3 and 4 that there are two operating cylinders at each side of the oven for each set of platens which are connected for simultaneous operations by piping connections 99 for fluid pressure controlled by suitable valves 100, 101.

The heating of the platen 90 and 91 is accomplished by a series of closely fitted units 102, preferably rectangular and formed of insulating material in which is embedded resistance wires 103, spirally disposed. The outer ends of the wires of the several units are connected to one of the conductors leading from a source of current and their inner ends are connected to the other conductor through an automatically operating thermal switch. Each of the heating units is attached to its respective platen by bolts 104 in its four corners and at its center by a sleeve bolt 105 which performs the dual purpose of holding the center of the unit in close contact with its platen and also enables me to locate a thermal element adjacent the working face of the plate. There being a number of these thermal elements spaced throughout the plates, as shown in Fig. 5, it will be seen that their overall temperature may be regulated to a nicety. The thermal elements may be of any approved construction such as a bi-metal rod 110 held in place by a threaded collar 111 on the outer extremity of the tubular bolt 105 and its inner end 112 located in contact with the working face of the platen. The outer end of the thermal rod extends into a cylindrical shell 113 containing thermostatically controlled contacts in the current feed wires of the respective resistance heating wires 103, as will be understood.

The green wall board sheets are fed between the platens 90, 91 by a conveyor mechanism arranged to pull a top sheet from the pallet 63 lengthwise, onto a foraminous carrier in the form of a woven wire mat 114 and deliver it between the platens where it is allowed to rest until thoroughly cured. There is one of these conveyors for each set of platens each comprising a forward shaft 115 journaled in a framework 116 located slightly ahead of the entrance end of an oven and a similar shaft 117 journaled in a frame 118, positioned at a considerable distance in rear of the oven. The shafts carry at their ends pairs of sprocket wheels 119 between which are rollers 120 supporting the conveyor belts. The sprockets are located in planes beyond the lateral edges of the platens and trained around them are endless chains 121, 122. On certain of the chain links are transversely extending arms 123 which when they are on the upper flights of the chains traverse the space between the platens when the latter are separated and constitute draw bars for moving the green sheets into curing position and removing the cured sheets from the platens. On certain of the other chain links there are short outwardly extending fingers 124 the ends of which extend laterally and carry guide blocks 125. These blocks slide along the upper edges of the lower platen 90 and perform the dual purpose of serving to support the upper flights of the chains and spacing the upper platen 91 for regulating the ultimate thickness of the puffed or finished wall board sheet.

In introducing the green board sheets and passing them through the oven I make use of the edges of the paper liners, indicated by 130 (Figs. 6 and 8), which are normally provided somewhat in excess of the width of the finished sheet to provide for the expansion of the enclosed material. To these edges I attach the clips or grippers forming the connection with the draw bars 123 thus avoiding marring or damaging any portion of the sheet. The grippers are shown in detail in Figs. 8 and 9 and comprise a metal strap 131 having a hook-shaped end 132 for engagement with a draw bar and a rear end which is provided with embossures forming dentures 133. On the underside of the strap 131 is secured a spring tongue 134 similarly embossed, as shown at 135. Extending over the strap and beneath the tongue is a movable collar 136 which may be adjusted to retain said parts clamped together in engagement with the paper liner edges 130. The grippers are engaged, as described, by hand while the green board is on the pallet 63 and their free ends 132 subsequently hooked over one of the draw bars as the conveyor chains bring it into position on the forward side of the front set of sprockets on shaft 115.

The mat surface, previously referred to, is the endless woven wire belt 114. It traverses the lower platen 90 and its looped ends are carried by the rolls 120. It aids in positioning or drawing the sheet into curing position between the platens and by reason of its open work character facilitates the escape of steam, or moisture, created during the intumescing, or curing operation. This method of supporting the wall board sheet during the curing period is important in that it permits the free egress of the steam from the center and intermediate points of the sheet and avoids the necessity of these gases seeking points of escape at the lateral edges of a sheet, thus preventing a so-called channelling effect in the puffed material. It also insures a uniform texture or porosity in the finished product.

The sheet conveyors are operated intermittently to allow a period of dwell in the oven in which the plastic mix is brought up to the required temperature to cause it to puff and harden. In order, therefore, that the operation of handling the sheets may be continuous, I arrange sets of platens one above the other, the illustrations showing four of such sets in a single oven, which with their respective conveyors are indicated generally by A, B, C and D. The relative intermittent operation of their respective conveyors is accomplished by separate motor drives $a$, $b$, $c$ and $d$, which rotate the respective shaft 117. It is noted with respect to these shafts that they are carried in movable journal boxes which by reason of the temperature changes to which the conveyors are subjected are under the tension of springs 137 which may be further regulated by hand screws 138 (Fig. 3).

In the construction of buildings it often happens that a sheet of wall board is secured in place by nailing one or both of its edges to studding or other underlying supports and because of the hardness of these boards, in some instances, at the points where the nails are driven, or in their porosity at such points in other cases, as well as the frequent carelessness of workmen, the edges of the sheets may occasionally be cracked, or chipped or become hammer marked, thus spoiling their appearance. To obviate these disadvantages insofar as possible and to facilitate the erection of these sheets in many building operations, I provide the nail holes in their marginal edges by perforating the sheet after it is placed between the platens and while it is still in its green or uncured condition.

The nail hole forming operation is accomplished by a series of vertically operated pin punches 139 guided in drill holes passing through the upper platen 91 and carried on stems 140 guided in drill holes passing through the overlying heater unit 102, and in which compression springs 141 may be located (Fig. 6). The pins are withdrawn to free the sheet when the upper platen 91 is elevated by the fluid pressure in the cylinders 97. However, as it is essential to retract the punches to remove them as obstructions in the path of a fresh sheet when it is being brought into curing position I provide means for automatically withdrawing them simultaneously with the elevation of the platen and in advance of such platen movement. This retraction of the punches is accomplished by connecting each of them with an operating lever 142 having a slotted extremity 143 in which engages a pin 144 on the stem 140 and pivoting the lever at an intermediate point on the platen, such as on the eye 93 and pivoting its outer end on the wall of the oven as indicated at 145 (Fig. 4).

It will be understood that it is not necessary that the curing mat 114 be made as part of the conveyor. If desired it may be made of a size to cover the lower platen 102 and secured permanently thereto by spot welding it to the platen, or it may be removably connected thereto, as by screws 146 arranged along its edges as shown in Fig. 11.

I claim:

1. In a machine for making wall board, a frame having spaced side pieces, a lower heated platen supported on the frame and an upper heated platen, levers pivoted on the frame pieces and connected to the upper platen, operating mechanisms supported on the frame pieces and connected to the said levers, means for operating said mechanisms simultaneously to raise and lower said platen and means for introducing a green sheet between the platens and extracting the cured sheet therefrom.

2. In a machine for making wall board, a frame having spaced side pieces, a lower heated platen supported on the frame and an upper heated platen, levers pivoted on the frame pieces and connected at their inner ends to the upper platen, fluid pressure cylinders mounted on the frame pieces and connected at their inner ends to the upper platen, fluid pressure cylinders mounted on the frame pieces having pistons connected to the outer ends of the levers, piping connections between the cylinders and a valve therein for controlling the movement of the pistons to simultaneously raise and lower the two sides of the platen, and means for introducing a green sheet between the platens and extracting the cured sheet therefrom.

3. In a machine for making wall board, a frame having spaced side pieces, a lower heated platen supported on the frame and an upper heated platen, levers pivoted on the frame pieces and connected to the upper platen, operating mechanism supported on the frame pieces and connected to the said levers, means for operating said mechanism simultaneously to raise and lower said platen and means for introducing a green sheet between the platen and extracting the cured sheet therefrom, said last named means comprising an open mesh woven wire continuous conveyor.

EASTMAN A. BURROWS.

REFERENCES CITED

The following references are of record in the file of this patent:

UNITED STATES PATENTS

| Number | Name | Date |
|---|---|---|
| 419,656 | Gesner | Jan. 21, 1890 |
| 907,877 | Rader | Dec. 29, 1908 |
| 1,332,457 | Burkhardt | Mar. 2, 1920 |
| 1,367,292 | Armstrong | Feb. 1, 1921 |
| 1,373,411 | Clark | Apr. 5, 1921 |
| 1,506,789 | Sutherland, Jr. | Sept. 2, 1924 |
| 1,558,459 | Birdsey | Oct. 27, 1925 |
| 1,587,189 | Schumacher | June 1, 1926 |
| 1,862,318 | Ruby | June 7, 1932 |
| 1,921,100 | Schnurer | Aug. 8, 1933 |
| 1,949,917 | Muench | Mar. 6, 1934 |
| 1,979,471 | Knopp | Nov. 6, 1934 |
| 2,094,862 | Welch | Oct. 5, 1937 |
| 2,258,880 | Bobst | Oct. 14, 1941 |
| 2,329,184 | Cann | Sept. 14, 1943 |

FOREIGN PATENTS

| Number | Country | Date |
|---|---|---|
| 552,680 | Great Britain | Apr. 20, 1943 |
| 762,146 | France | Apr. 4, 1934 |